US006401847B1

(12) United States Patent
Lykken

(10) Patent No.: US 6,401,847 B1
(45) Date of Patent: *Jun. 11, 2002

(54) VEHICLE TRACK UNDERCARRIAGE ADJUSTMENT SYSTEM

(75) Inventor: Thomas G. Lykken, Fargo, ND (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,373

(22) Filed: Nov. 8, 1996

(51) Int. Cl.⁷ ................... B62D 55/084; B62D 55/30
(52) U.S. Cl. ................... 180/9.1; 180/9.52; 305/116; 305/129; 305/138
(58) Field of Search ............... 180/9.1, 9.48, 180/9.5, 9.52, 9.26; 305/116, 120, 20, 121, 131, 134, 153, 154, 145, 143

(56) References Cited

U.S. PATENT DOCUMENTS

| | | | |
|---|---|---|---|
| 251,513 A | * | 12/1881 | Benson |
| 1,106,595 A | * | 8/1914 | Tolles |
| 1,756,770 A | * | 4/1930 | Venzlaff et al. |
| 3,082,044 A | * | 3/1963 | Klemm et al. |
| 3,275,386 A | * | 9/1966 | Bexten |
| 3,937,289 A | | 2/1976 | Dickinson .............. 180/9.44 |
| 4,448,273 A | | 5/1984 | Barbieri .............. 180/9.21 |
| 4,519,465 A | * | 5/1985 | Triplett .............. 180/6.48 |
| 4,949,800 A | * | 8/1990 | Virly .............. 180/9.21 |
| 4,953,919 A | * | 9/1990 | Langford .............. 305/31 |
| 4,966,242 A | | 10/1990 | Baillargeon .............. 180/9.44 |
| 5,127,714 A | | 7/1992 | Satzler |
| 5,293,948 A | | 3/1994 | Crabb |
| 5,312,176 A | | 5/1994 | Crabb |
| 5,409,305 A | * | 4/1995 | Nagorcka .............. 305/21 |
| 5,752,574 A | * | 5/1998 | Oertley .............. 180/9.5 |

FOREIGN PATENT DOCUMENTS

JP  3096489  * 4/1991  .............. 305/120

* cited by examiner

Primary Examiner—Anne Marie Boehler
(74) Attorney, Agent, or Firm—A. N. Trausch

(57) ABSTRACT

This invention includes an undercarriage support and adjustment system for a tracked vehicle having first and second elongated outwardly extending members coupled to the vehicle, a first undercarriage bearing support coupled to the vehicle between the first and second outwardly extending members, and an undercarriage bearing support member slidingly coupled to the outer ends of the two support members and having a second undercarriage bearing support.

19 Claims, 8 Drawing Sheets

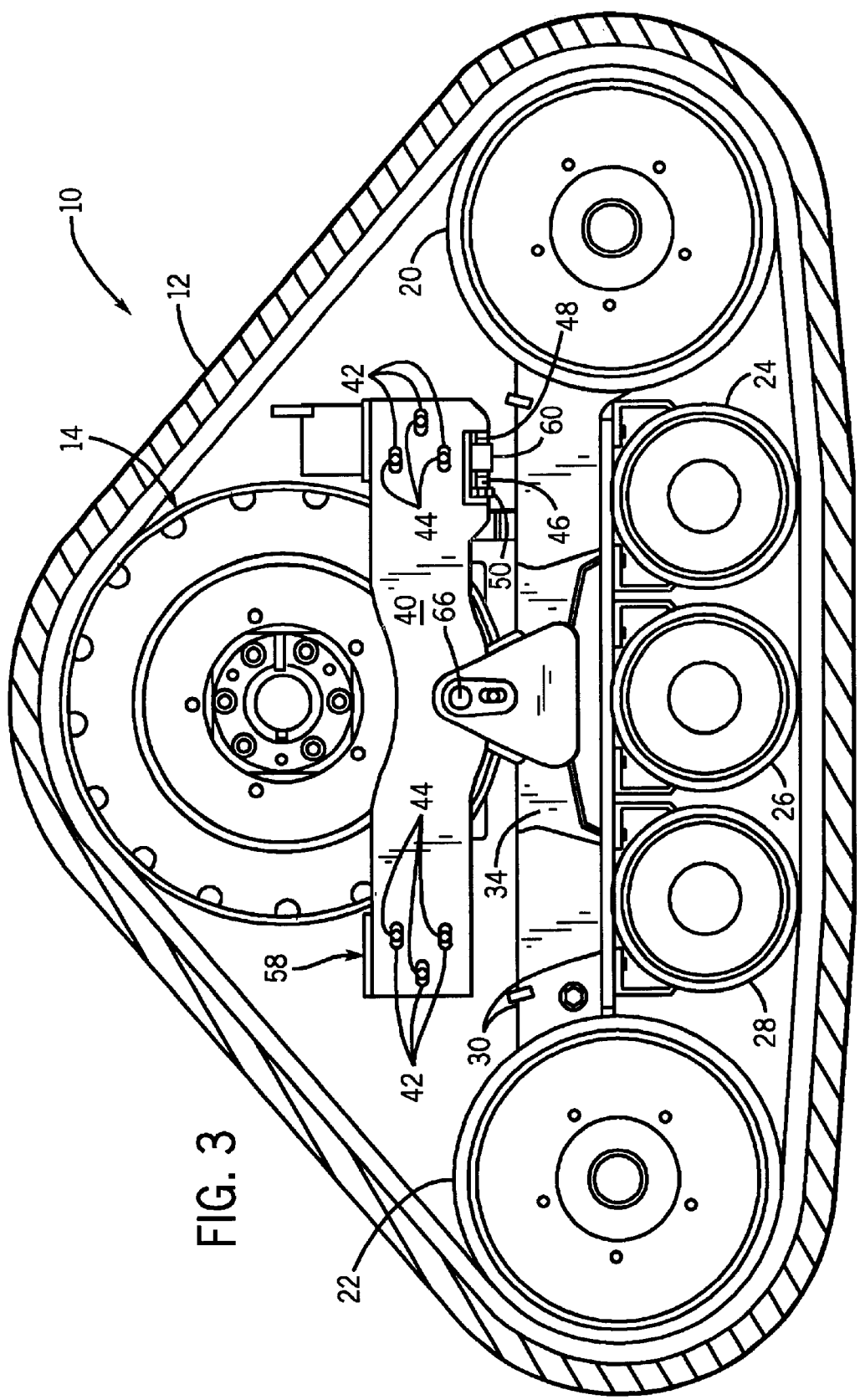

VEHICLE TRACK UNDERCARRIAGE ADJUSTMENT SYSTEM

FIELD OF THE INVENTION

The present invention relates generally to the undercarriage of a tracked vehicle. More particularly, it relates to a system for aligning undercarriage drive, idler and roller wheels of a work vehicle having a rubber track.

BACKGROUND OF THE INVENTION

In the field of track systems for work vehicles, such as agricultural tractors and combines, a number of undercarriage arrangements have been proposed and are presently in use. Such undercarriages typically include a drive wheel and several idler and roller wheels arranged such that their rotational axes are parallel and the center planes of each wheel (i.e. a plane for a wheel that is perpendicular to that wheel's rotational axis and passes through the center of the wheel) are coplanar. By arranging the wheels in this fashion, a track passing over the outside surface of the wheels is maintained in a fixed relationship with each wheel.

Providing and maintaining the alignment of the drive wheels with respect to the idler and roller wheels and the track is difficult due to manufacturing tolerances, uneven wear, and damage to suspension components. Typically, when the idler and roller wheels are misaligned with respect to the drive wheel, the track will not remain centered over each wheel as they rotate, but will migrate toward one side of the wheels over time. In the event the track is equipped with lugs (usually on its inner surface) to prevent such track migration, the migratory forces will force these lugs against the grooves in the wheels that receive the lugs and guide the track. This will cause the lugs to rapidly wear away.

To compensate for these factors, tracked vehicle undercarriage systems are usually adjustable, allowing relative motion between the drive wheels and other wheels of the undercarriage. U.S. Pat. No. 5,127,714 (the '714 system") discloses one such system. In the '714 system, a single drive wheel is provided at the after portion of the vehicle, a series of roller wheels extend forward of the drive wheel connected to a beam, and a forwardmost adjustable idler wheel is provided. The system disclosed in these patents allows the forwardmost idler wheel to be adjusted relative to the drive wheel. The idler wheel is mounted on a horizontally extending member that itself is adjustable with respect to the beam to which the roller wheels are attached. By pivoting the forwardly extending member inwardly or outwardly about pin 62, the center plane of the idler wheel may be moved in an axial direction. This pivoting is provided by alternatively loosening and tightening jack screws on both an inwardly facing and outwardly facing surface of the beam. Due to its position, the inwardly facing jack screw is difficult to adjust. While allowing the forwardmost idler wheel to be adjusted with respect to the drive wheel, this system does not apparently allow the roller wheels located between the drive wheel and the idler wheel to be adjusted. To adjust each of these wheels with respect to the drive wheel and the idler wheel would apparently require separate adjustment of each wheel.

In another device, shown in U.S. Pat. Nos. 5,312,176 and 5,293,948, the idler wheels 58 and 60 are similarly coupled to the forward end of the roller wheel frame, and are apparently adapted to pivot about pivot pins 102 and 104. These pins define a substantially vertical axis extending through the center of the idler wheel. A forked lever member 93 extends backward from the idler wheel and pivots the idler wheel about the pivot pins. Similar to the '714 system, the idler wheel pivots when inward and outward facing screws 128 and 130 are adjusted. As with the '714 system, the idler wheels do not adjust together with the idler wheel, nor is there a method for adjusting the idler wheels shown. They appear to be in a fixed relationship with respect to drive wheel 32. In a manner also similar to the '714 system, adjustment of the idler wheel increases the tension on one side of the belt and reduces the tension on the other side of the belt, possibly accelerating wear and increasing the risk of failure. It is this increased tension that causes the track to be aligned, since an unequally tensioned track will migrate laterally across the idler toward the higher tensioned side as discussed below.

Neither of the above examples allow the idler and roller wheels to be collectively adjusted with respect to the drive wheel, thereby preserving their relative adjustment and allowing them to be collectively adjusted with respect to the drive wheel. Neither of the above examples maintains a constant track tension on either side of the elastomeric track, thus risking accelerated track wear.

There is a need, therefore, for an improved system for adjusting a tracked vehicle undercarriage. In particular, there is a need for an undercarriage that provides for easy adjustment. There is also a need for an undercarriage that can be adjusted without unequally tensioning the track. There is also a need for an adjustable undercarriage that preserves the alignment between the drive wheels and the idler wheels.

SUMMARY OF THE INVENTION

The present invention provides a novel apparatus for supporting and adjusting a tracked vehicle undercarriage that provides for the above needs.

Thus in accordance with the current invention, an undercarriage support and adjustment system for a tracked vehicle having a drive wheel is provided, including a first and second elongated outwardly extending members coupled to the vehicle, a first undercarriage bearing support coupled to the vehicle between said first and second outwardly extending members, and an undercarriage bearing support member slidingly coupled to the outer ends of the two support members and having a second undercarriage bearing support. The first member may extend outwardly forward of the drive wheel's axis of rotation and the second member may extend outwardly in a position aft of the drive wheel's axis of rotation. The first undercarriage bearing support may be coupled to the vehicle below the drive wheel's axis and inside of the drive wheel, and the second undercarriage bearing support may be coupled to the vehicle below the drive wheels axis and outside of the drive wheel. The first and second undercarriage bearing supports may share a common axis that extends substantially laterally with respect to the vehicle. The undercarriage bearing support member may be coupled to the first and second members at first and second coupling points respectively, and the second undercarriage bearing support may be disposed between the first and second coupling points. The undercarriage bearing support member may have a plurality of elongate adjustment slots at the first and second coupling points. The first elongate member may have an adjusting screw and a fore-and-aft extending threaded boss for receiving the adjusting screw. The undercarriage bearing support member may have an abutting surface adapted to contact the end of the adjusting screw. The vehicle may also have an undercarriage with a plurality of wheels coupled to an elongate fore-and-aft wheel mounting beam with first and second laterally opposed mounting brackets coupled to the wheel mounting beam that are coupled to the first and second undercarriage bearing supports, respectively.

In accordance with a second embodiment of the invention, a method of aligning a tracked suspension includes the step of rotating a first wheel and track with respect to each other about a relative rotational axis that transects the wrap angle when the relative rotational axis is translated to intersect the first rotational axis. The relative rotational axis may be within 30 degrees (+/−30 degrees) of dividing the wrap angle into two equiangular portions, or may actually divide the wrap angle into two such portions. The rotation about the relative axis may be performed by rotating either track or wheel with respect to the other by rotating both together, or by rotating the track and at least one other wheel with respect to the first wheel.

Other principal features and advantages of the invention will become apparent to those skilled in the art upon review of the following drawings, the detailed description and the appended claims.

BRIEF DESCRIPTION OF THE DRAWINGS

FIG. 3 is a side view of the undercarriage of FIG. 1;

Figure 1:
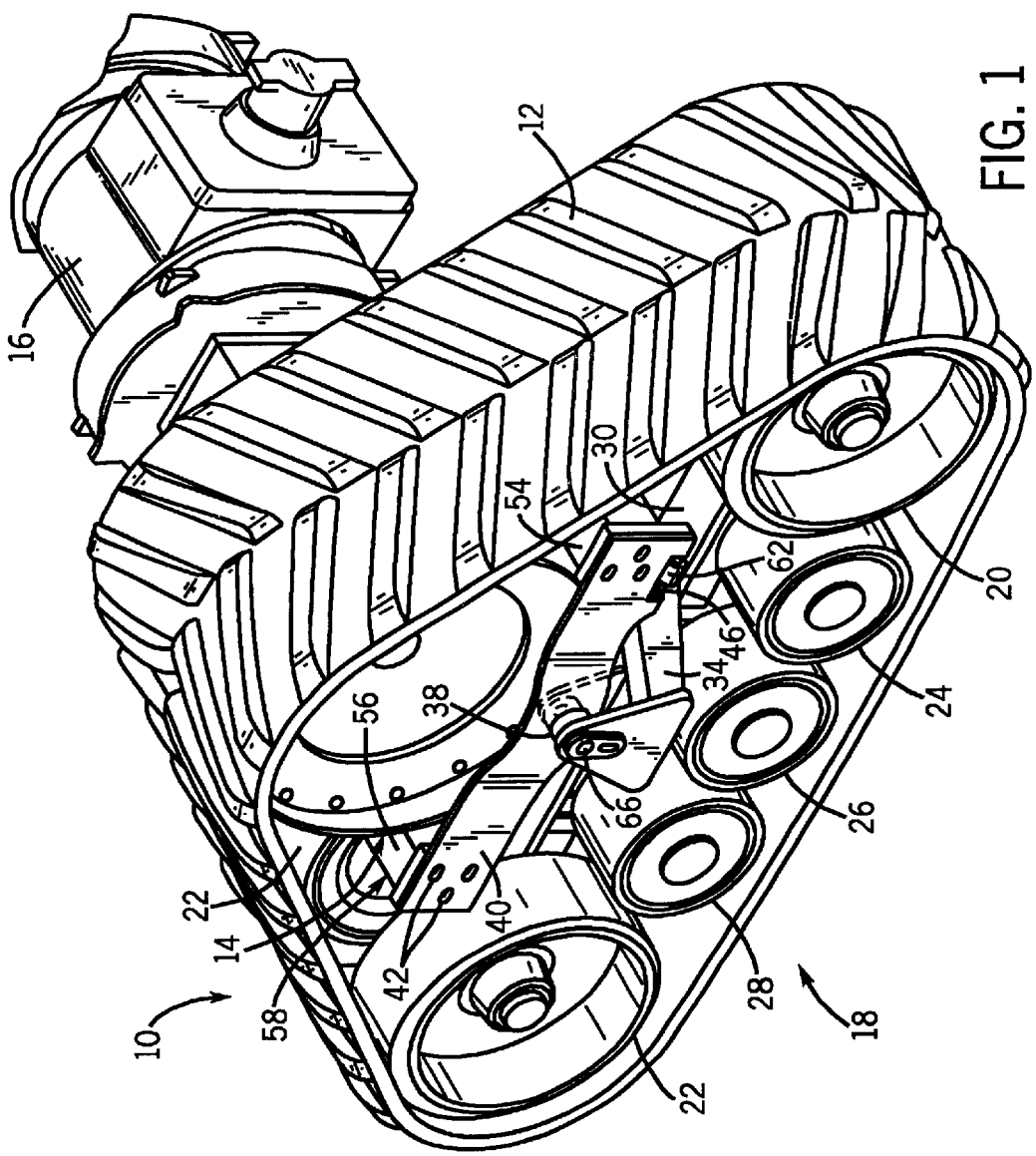
FIG. 1 is a perspective view of a tracked vehicle undercarriage in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

The subject of this application is generally an undercarriage for a work vehicle. To describe the interrelationship and relative positions of various elements of the undercarriage and the work vehicle, certain naming conventions have been chosen. In this description, therefore, the terms "side-to-side" and "fore-and-aft" refer to directions relative to the direction of movement of the work vehicle to which the undercarriage is mounted. In other words, "side-to-side" is a direction roughly transverse to the direction of forward motion of the vehicle, and "fore-and-aft" is a direction roughly parallel to the direction of movement of the vehicle. Similarly, the terms "above" or "below" refer to relative positions of various components as they would appear when attached to the work vehicle, and the work vehicle is in its normal, upright operating position on level grounds. Similarly, "front" or "rear" refer to the front or rear of the work vehicle, respectively. The terms "inner" and "outer" refer to relative positions closer to, or more remote from the work vehicle, respectively.

Figure 2:
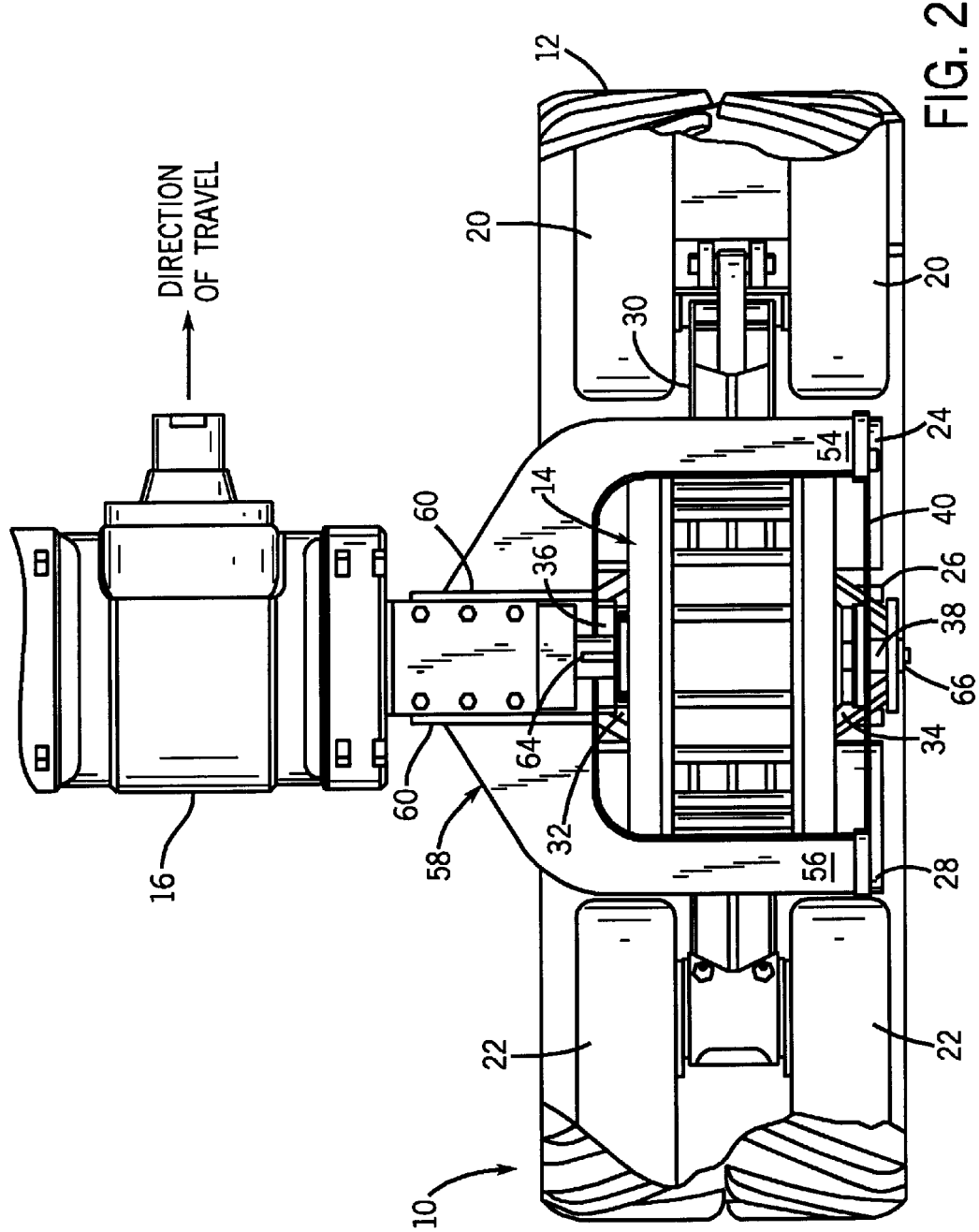
FIG. 2 is a partial cross-sectional plan view of the undercarriage of FIG. 1.

Turning now to the drawings, FIGS. 1 and 2 illustrate a vehicle suspension 10 for a work vehicle having a track 12, a drive wheel 14 extending from differential 16 for driving track 12, and an undercarriage 18. Undercarriage 18 includes a front idler wheel 20 and rear idler wheel 22 about which track 12 is wrapped, roller wheels 24, 26, and 28 for guiding track 12, all of which are supported by undercarriage beam 30 which extends fore-and-aft, and to which wheels 20, 22, 24, 26 and 28 are coupled while the "front idler wheel," "rear idler wheel," "drive wheel" and "logic wheel" are singular terms, a plurality of wheels may be provided at each relative position in side-to-side orientation, such as in this embodiment.

Figure 4C:
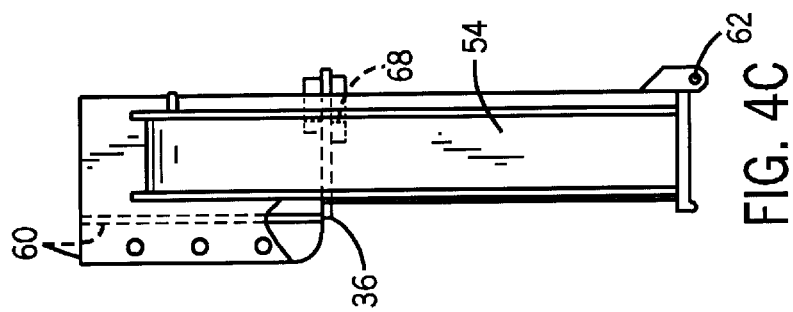
FIGS. 4A–C are top, side and end views, respectively, of the mounting yoke shown in FIG. 1.
Figure 4A:
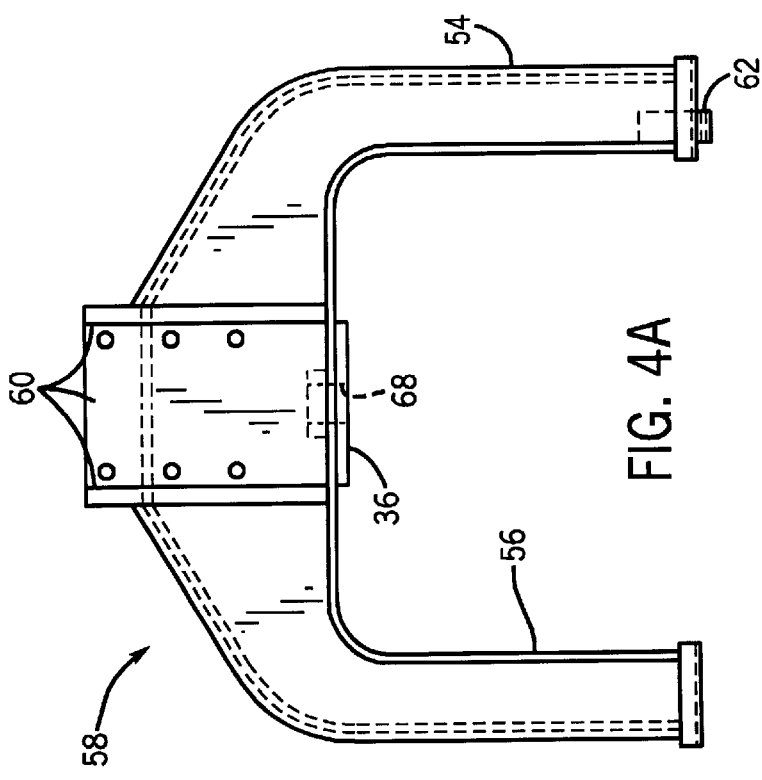
Figure 4B:
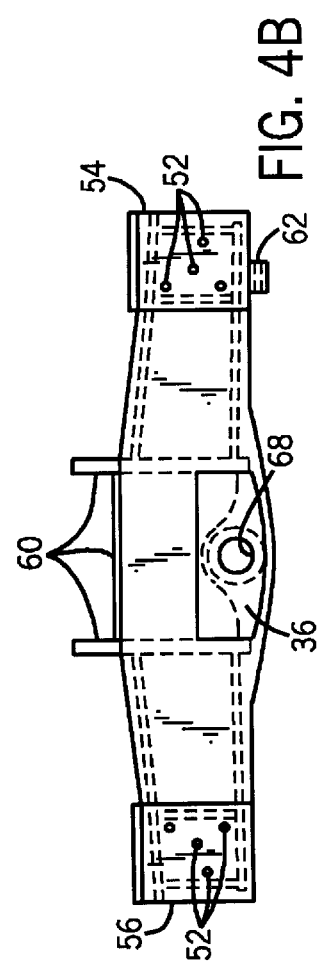

Laterally extending brackets 32 and 34, are coupled to undercarriage beam 30 and support the undercarriage. Inner bracket 32 is rotationally coupled to inner undercarriage bearing support 36 (FIG. 4), and outer bracket 34 is rotationally coupled to outer undercarriage bearing support 38. The rotational coupling allows the undercarriage and its five wheels to rotate about an axis that extends substantially side-to-side with respect to the vehicle passing through the two bearing supports. The outer bearing support is adapted to provide some adjustment to that axis, which will be discussed below.

Referring to FIGS. 1 and 3, outer undercarriage bearing support 38 is part of outer undercarriage bearing support member 40, which extends substantially fore-and-aft. This elongated member has elongated fore-and-aft slots 42 through which bolts 44 (bolt heads are not shown) are passed. These slots are disposed in two groups, each group disposed at opposing ends of support member 40. When bolts 44 are loosened, support member 40 may be moved fore-and-aft by rotating adjuster screw 46, the ends of which abut positioning surfaces 48 and 50 on support member 40. The manner of adjustment will be discussed in detail below.

Bolts 44 passing through the forward group of slots 42 are engaged to holes 52 (FIG. 4B) in forward elongated member 54. Bolts 44 passing through the rearward group of slots 42 are engaged to holes 52 (FIG. 4B) in rear elongated member 56. The slots allow some fore-and-aft movement of support member 40 when loosened. When bolts 44 are tightened, the ends of support member 40 are fixed with respect to elongated members 54 and 56.

Members 54 and 56 are coupled together to form mounting yoke 58, shown in FIGS. 2 and 4A–C. The mounting yoke also includes inner undercarriage bearing support 36 and attachment plates 60. Holes in attachment plates 60 are provided to attach yoke 58 to the frame of the work vehicle. Bearing support 36 is oriented between members 54 and 56. Forward elongate member 54 has a threaded screw adjuster mount 62 which receives adjuster screw 46. As adjuster screw 46 is screwed into or out of mount 62, either its threaded end or headed end of adjuster screw 46 contacts positioning surface 48 or 50 (FIG. 3), respectively. With bolts 44 loosened, successive turns of adjuster screw 46 causes support member 40 to move either forward or aft with respect to yoke 58. This results in outer undercarriage bearing support 38 moving forward or rearward with respect to inner undercarriage bearing support 36. Since these two supports support the undercarriage via brackets 32 and 34, forward motion of support member 40 causes the forward end of undercarriage beam 30 to move inwardly toward the work vehicle and the rear end of beam 30 to move outwardly away from the work vehicle. Similarly, when support member 40 is moved rearward, the front end of beam 30 moves outward and the rear end of beam 30 moves inward.

Figure 5:
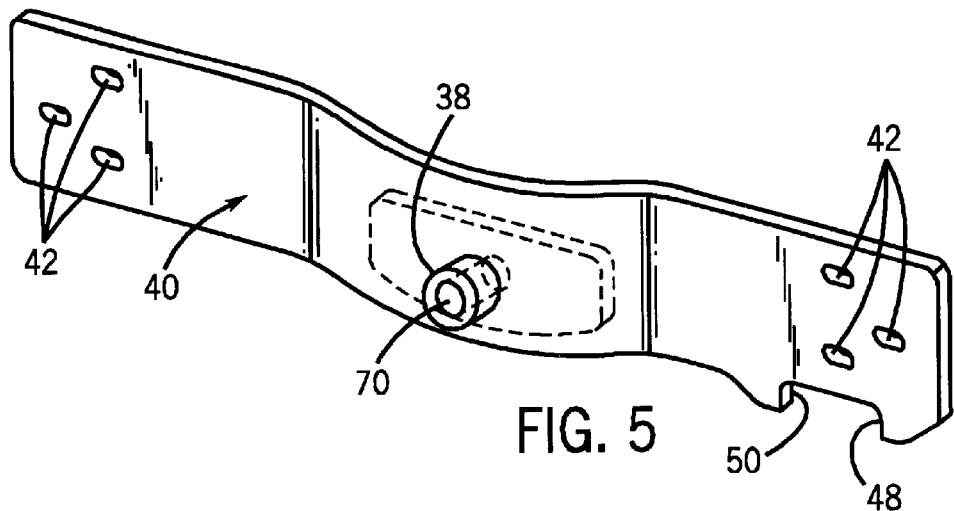
FIG. 5 is a side view of an undercarriage bearing support member.

To couple the undercarriage to the vehicle, circular pins 64 and 66 are inserted into holes in brackets 32 and 34 and thence into holes 68 and 70 (FIGS. 4 and 5) in undercarriage bearing supports 36 and 38, respectively. Brackets 32 and 34 are rotationally coupled to the bearing supports. Friction is reduced by wound polytetrafluoroethylene (PTFE) bearing liners (not shown) which are force fit into holes 68 and 70 in the inner and outer undercarriage bearing supports. These pins provide the undercarriage with limited rotation to accommodate irregularities in the surface of the ground.

Figure 6:
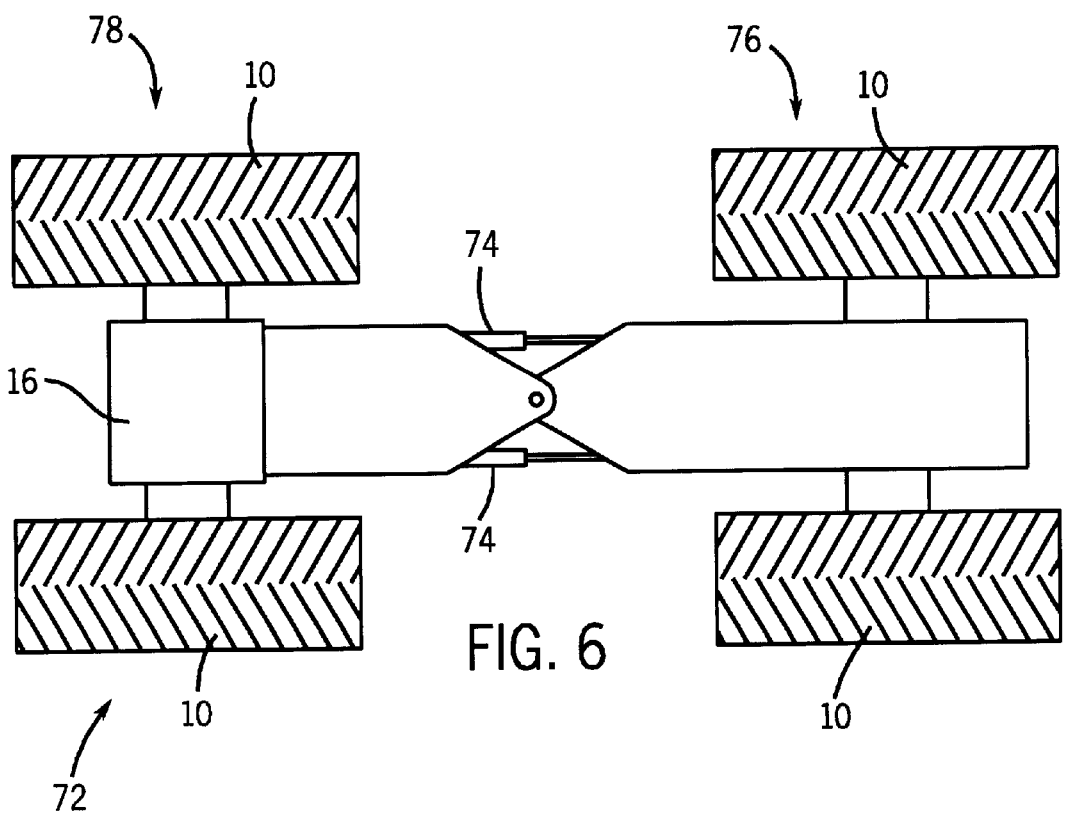
FIG. 6 is a plan view of a work vehicle incorporating four tracked suspension.

Suspension 10 is of particular value in a four drive axle articulated work vehicle 72, such as that shown in FIG. 6. The FIG. 6 vehicle employs four suspensions 10 (two shown here) at each corner of the vehicle. Vehicle 72 is steered by selectively actuating hydraulic actuators 74 which cause the front portion 76 and the rear portion 78 of vehicle 72 to pivot with respect to each other about pivot point 80. Since the suspensions 10 are relatively short, two can be placed on each side of a work vehicle, in a fore-and-aft arrangement and an articulated design is possible.

To adjust the work vehicle's suspension and provide the proper orientation of track 12, the vehicle should first be driven in a straight line to determine the "preferred" position of track 12 with respect to the idler wheels. If the track is running toward the inside of the forward and rear idler wheels, the front end of beam 30 must be moved inward and the rear end outward. This is accomplished by loosening bolts 44 and adjusting adjuster screw 46 to move support member 40 forward, then tightening bolts 44. Conversely, if the track is running toward the outside of the forward and rear idler wheels, the front end of beam 30 must be moved outward and the rear end inward. This is accomplished by loosening bolts 44 and adjusting adjuster screw 46 to move support member 40 rearward, then tightening bolts 44. Thus, alignment of the entire undercarriage with respect to the drive wheel requires the adjustment of a single easily accessible adjuster screw.

In the prior art track systems, the front idler was adjustable, rotating about a pivot pin located a short distance behind the front idler or rotating about the central axis of the idler itself. The rollers were apparently fixed to a rail or rails extending fore-and-aft that was itself fixed to the frame. When the front idler was pivoted, the tension on each side of the track was unequal, since one edge of the idler moves toward the drive wheel and the other edge of the idler moves away from the drive wheel, slackening and stretching opposing lateral sides of the track, respectively, and causing accelerated wear of the track and undercarriage components. This is eliminated in the present design by having two idlers—one disposed in front of the drive wheel and one disposed behind the drive wheel—and by having both idlers adjusted simultaneously as described above. Both the forwardmost and rearmost wheel in suspension 10 are idlers. This provides the effect of adjustably rotating the idler and roller wheels about an axis passing through the drive wheel. Since in the subject invention the front and rear idlers are fixed with respect to each other during adjustment, the track is not tensioned unevenly as in the prior art. In the prior art systems, the forwardmost and rearmost wheels (i.e. the front idler wheel and the rear drive wheel) are not fixed with respect to each other during adjustment, but move relative to each other, and therefore apply unequal tension on each side of the track. Furthermore, by also rotating the roller wheels during adjustment and preserving their position relative to the idler wheels, the subject suspension system keeps the roller wheels in alignment with the rest of the wheels, unlike the prior art systems in which the idlers were fixed with respect to the vehicle when the forwardmost idler wheel was adjusted.

Figure 7:
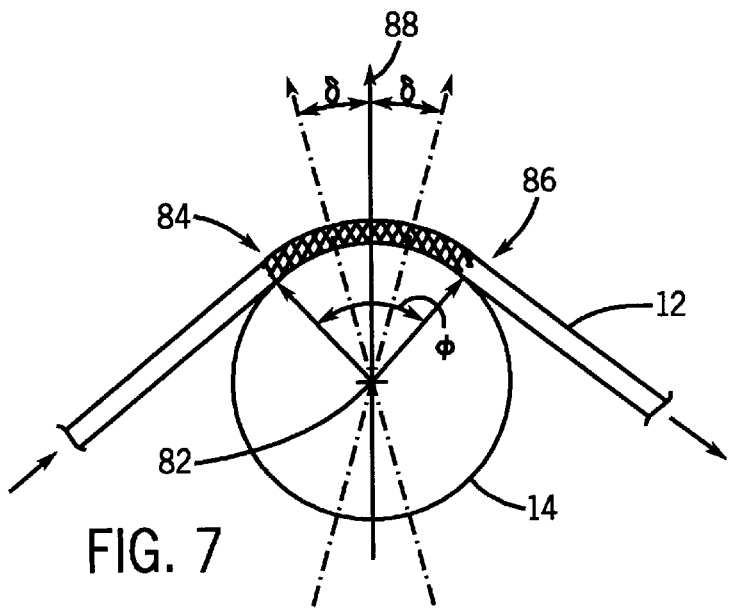
FIG. 7 is a schematic end view of the drive wheel wrapped with a portion of the track showing their relative orientation in two extreme adjustment positions.

The advantages of the above embodiments can be more easily explained with reference to a schematic illustration of the drive wheel and the track portion wrapped about the drive wheel. FIG. 7 discloses a drive wheel and track similar to that disclosed in FIGS. 1–6. In FIG. 7, drive wheel 14 is shown with a portion of track 12 wrapped about it, the rest of track 12 being cutaway for convenience of illustration. FIG. 7 is a view from one end of drive wheel 14 and thus the axis of rotation of drive wheel 14 appears as a single point 82.

The advantages of adjusting the track as described above are due to the manner in which the drive wheel is adjusted with respect to the track. In these embodiments track 12 is wrapped about the circumference of drive wheel 14 over an angle of about 90 degrees. This angle, called the "wrap angle," is identified in FIG. 7 as angle phi. It is defined between two vectors, each extending from the axis of rotation 82 of the track. One vector extends from the axis of rotation to point 84 at which the track makes contact as it approaches drive wheel 14. The other vector extends from the axis of rotation to the point 86 at which track 12 breaks contact with drive wheel 14 as it moves away from drive wheel 14.

The frictional contact of track 12 with respect to drive wheel 14 is in large part controlled by the wrap angle. For a given tension in track 12, the frictional force between drive wheel 14 and track 12 increases as the wrap angle increases. The maximum practical size of wrap angle phi is between 200 and 240 degrees. The minimum practical size of wrap angle phi is between 10 and 35 degrees. The wrap angle also defines the optimum angle for adjusting the suspension system.

As described above, in the embodiments of FIGS. 1–6 and as shown schematically here in FIG. 7, the suspension system rotates with respect to drive wheel 14 about an axis of relative rotation 88 that extends vertically and passes through inner undercarriage bearing support 36 (FIG. 2). This relative rotation changes the relative orientation of track 12 with respect to drive wheel 14. As shown in FIG. 7, axis of relative rotation 88 bisects wrap angle phi. In other words, when the axis of rotation is projected into a plane perpendicular to the axis of rotation of the wheel (i.e. the view of FIG. 7), axis of relative rotation 88 is disposed between the two vectors that define the wrap angle.

By moving the track relative to the wheel about an axis that transects the wrap angle, the subject device corrects the alignment of the wheel and track in a manner fundamentally different from the method employed in the '714 patent discussed above. In the present device, and due to the particular orientation of axis of relative rotation 88 with respect to the wrap angle phi, when drive wheel 14 is adjusted, its changing angular orientation with respect to track 12 applies a force to the belt that urges it to translate laterally across the face of the drive wheel in a direction perpendicular to the direction of travel of the belt as shown in FIG. 8.

Figure 8:
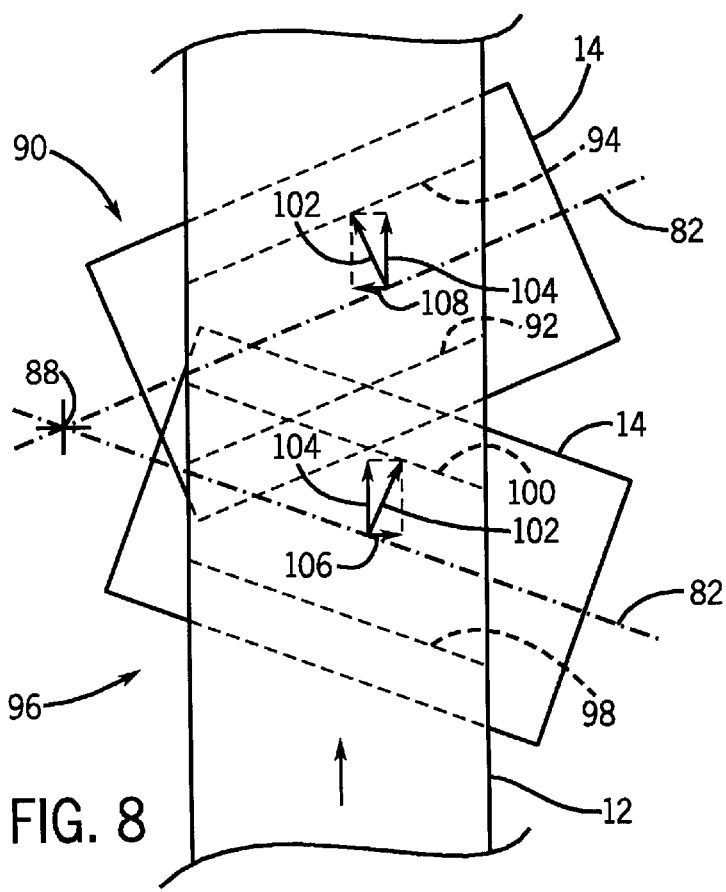
FIG. 8 is a top view of the FIG. 7 schematic showing the two positions.

In FIG. 8, a schematic top view of the embodiment of FIGS. 1–7 can be seen. Track 12 is show cutaway for convenient representation. Drive wheel 14 is shown in two alternate positions 90 and 92 to which it can be adjusted using the adjustment structures shown and described in more detail in conjunction with FIGS. 1–6 above. Axis of relative rotation 88 is projected in this view as a point. The area of the track in contact with the drive wheel in position 90 is the portion of track between initial contact line 92 and final contact line 94. The area of the track in contact with the drive wheel in position 96 is the portion of track between initial contact line 98 and final contact line 100. In position 96, over the entire contact area (the area of track 12 between the initial and final contact lines) drive wheel 14 applies an overall force 102 in the direction of its rotation. This force can be divided into two force components 104 and 106 that are parallel to the direction of track rotation around the wheels of suspension 10 and perpendicular to the direction of track rotation, respectively. Perpendicular force 106 pushes the belt sideways with respect to its normal path. In position 90, the other extreme adjustment position, the drive wheel similarly applies a force component 108 to the track that pushes it in the opposite lateral direction. Thus, as the belt passes over the drive wheel, the drive wheel tries to steer the belt to one side in one position, and to the other side in the other position. This "steering" capability is provided by orienting the axis of relative rotation 88 to transect the wrap angle.

Figure 9:
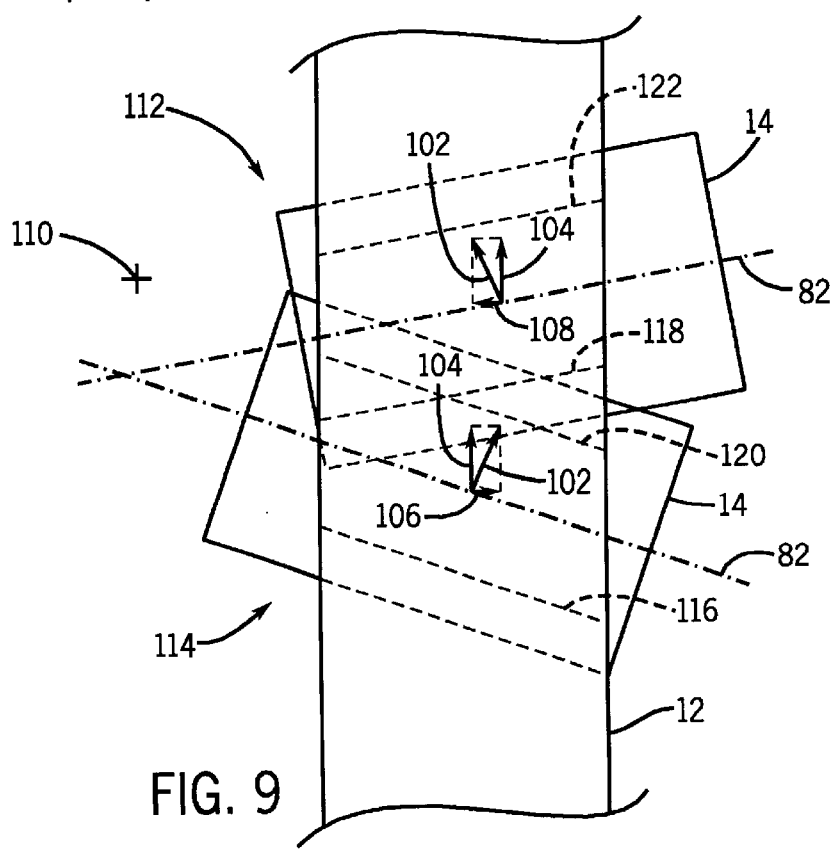
FIG. 9 is a schematic top view of the FIGS. 7–8 drive wheel and track as they would appear in two alternative positions if rotated about a different relative axis than that shown in FIGS. 7–8.

The wrap angle need not be disposed to intersect the axis of rotation of the adjustable wheel (drive wheel 14 in this embodiment), to provide the advantages of track adjustment by "steering," however. FIG. 9 is a schematic representation of an alternative arrangement similar to that of FIGS. 1–8, yet having an axis of relative rotation 110 of the drive wheel with respect to the track offset from the axis of rotation of the adjustable wheel. Track 12 is similarly wrapped around drive wheel 14. Drive wheel 14 is shown in two adjustment positions 112 and 114. The initial contact lines are 116 and 118. The final contact lines are 120 and 122. Unlike FIG. 8, the axis of relative rotation 110 in this figure is offset from the axis of rotation 82 of drive wheel 14. Although this example is shown in schematic form for ease of description, the offset could be provided in the FIGS. 1–6 embodiment by modifying that embodiment to shift both the inner undercarriage bearing support and the outer undercarriage bearing support forward. Since the axis of relative rotation 88 passes through the inner undercarriage bearing support of FIG. 2, as explained above, by shifting the inner undercarriage bearing support forward, the axis of relative rotation would also shift forward.

Comparing FIG. 8 with FIG. 9, it can be seen that the drive wheel still exerts a sideways component of force as described regarding FIG. 8. Just as shown in FIG. 8, the sideways components 106 and 108 are directed toward opposite sides of the track in the two extreme adjustment positions 112 and 114.

Figure 10:
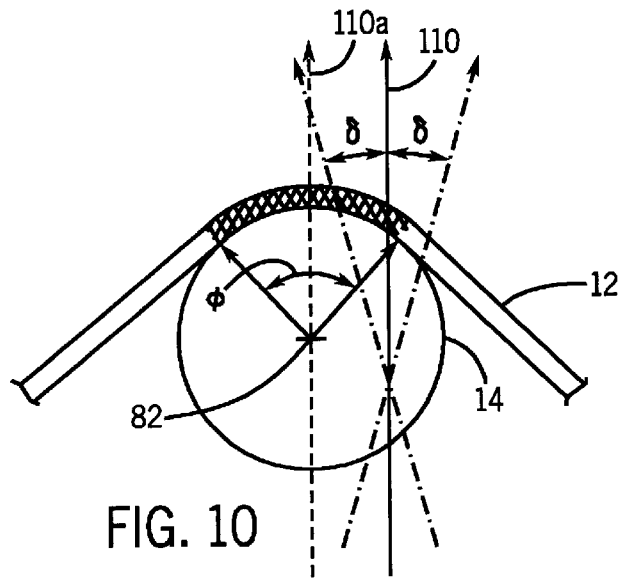
FIG. 10 is a schematic end view of the drive wheel of FIG. 9 with wrapped track.

In FIG. 10, we can view the FIG. 9 embodiment from the end of drive wheel 14 looking into the system along the rotational axis 82 of drive wheel 14. This is the same viewpoint as that of FIG. 7, above. Note in FIG. 10 that the axis of relative rotation 110 of the drive wheel with respect to the track is similarly disposed to transect the wrap angle phi. This can be seen more clearly by translating the axis of relative rotation 110 to its new position 110a shown here as a dashed line.

While the axis of relative rotation of the drive wheel with respect to the track transects the wrap angle in both FIGS. 7 and 10, it need not bisect the wrap angle in two equal parts as shown in both FIGS. 7 and 10 in order to provide the advantage of adjusting the track by "steering." If the wrap angle varies by as much as plus-or-minus thirty degrees (shown in both FIGS. 7 and 10 as angle sigma) the effect of "steering" will still be substantially provided.

As mentioned above in regard to FIG. 7, this method of "steering" the track to adjust its position is fundamentally different from the method disclosed in the '714 patent. In the '714 patent the track is adjusted by rotating the adjustable wheel (an idler wheel in the '714 patent) about a relative rotational axis that is oriented 90 degrees away from the axis of the present embodiment.

Figure 11:
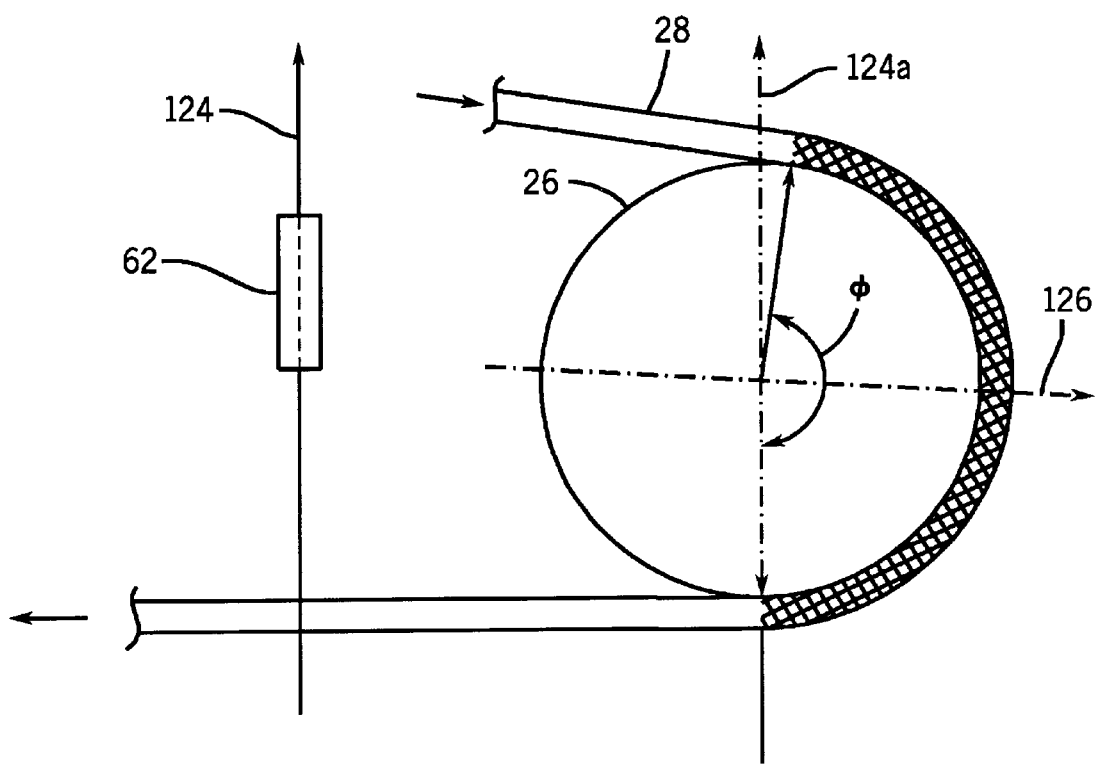
FIG. 11 is a schematic end view of the front idler of the '714 patent.

In FIG. 11 we can see the front idler wheel 26 of the '714 suspension system with a portion of belt 28 wrapped around it. In FIGS. 1 and 2 of the '714 patent a pivot pin 62 is shown about which the front idler wheel 26 is rotated to angle the wheel through an angle 100 (not shown), thereby adjusting the belt. Pin 62 therefore defines the axis of relative rotation 124 of wheel 26 with respect to belt 28. Note that in the '714 patent, idler wheel 26 is adjusted with respect to belt 28, whereas in the illustrated embodiments of the subject invention the track is adjusted with respect to the drive wheel. Regardless of whether a track is adjusted relative to a stationary wheel, or a wheel is adjusted relative to a stationary track, both the present and the '714 system define an axis of relative rotation about which this adjustment occurs. The '714 embodiment has a wrap angle phi defining that portion of the circumference of the idler wheel 26 about which belt 28 is wrapped. This angle approaches 180 degrees.

Referring back to FIG. 11, the axis of relative rotation 124 is shown, as well as the wrap angle phi of the '714 patent. Item 124a is the axis of relative rotation translated to intersect the rotational axis of wheel 26. Translational axis of relative rotation 124a clearly does not transect the wrap angle, nor does it fall within the preferred +/−30 degrees of bisecting the wrap angle.

By rotating front wheel 26 about axis 124, the '714 patent relies on unequal tension to adjust the belt, and not on "steering." As wheel 26 is rotated about pin 62 (i.e. axis 124) one side of belt 28 is slackened and one side of belt 28 is tightened. By providing uneven tension in the elastomeric belt, it tends to "climb" toward the more tense side. As the Abstract of the '714 patent notes: "[b]y angling one of the wheels in a direction opposite to the direction the belt runs untrue, the belt can be made to run true." This method of adjustment relies upon unequal tensioning of the belt, which can lead to overstrain and failure.

In comparison to this tensioning method, if the method of the present application was employed, the axis of relative rotation would be disposed to transect the wrap angle shown in FIG. 11. This preferred axis is identified as item 126 in FIG. 11. By rotating the wheel about axis 126 rather than '714 axis 124, wheel 26 would "steer" belt 28, instead of selectively tensioning one side over the other and forcing elastomeric belt 28 to "climb" toward the high tension side.

Thus, it should be apparent that there has been provided in accordance with the present invention a vehicle track undercarriage adjustment system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An undercarriage support system for a tracked vehicle having a drive wheel with a rotational axis comprising:

first and second elongated outwardly extending members couplable to the vehicle;

a first undercarriage bearing support couplable to the vehicle between said first and second outwardly extending members and configured to support an undercarriage;

an undercarriage bearing support member slidingly couplable to the outer ends of the two support members and having a second undercarriage bearing support configured to support an undercarriage.

2. The support system of claim 1 wherein the first member is configured to extend outwardly in a position forward of the drive wheel's axis of rotation and the second member is configured to extend outwardly in a position aft of the drive wheel's axis of rotation.

3. The support system of claim 2, wherein the first undercarriage bearing support is couplable to the vehicle below the drive wheel's axis and inside of the drive wheel, and the second undercarriage bearing support is couplable to the vehicle below the drive wheel's axis of rotation and outside of the drive wheel.

4. The support system of claim 3, wherein the first and second undercarriage bearing supports share a common axis that extends substantially laterally with respect to the vehicle.

5. The support system of claim 4, wherein the undercarriage bearing support member is coupled to the first and second members at first and second coupling points respectively, and wherein the second undercarriage bearing support is disposed between the first and second coupling points.

6. The support system of claim 5, wherein the undercarriage bearing support member has a plurality of elongate adjustment slots at the first and second coupling points.

7. The support system of claim 6, wherein the first elongate member further comprises an adjusting screw and a fore-and-aft extending threaded boss adapted to receive the adjusting screw.

8. The support system of claim 7, wherein the undercarriage bearing support member further comprises an abutting surface adapted to contact the end of the adjusting screw.

9. The support system of claim 1 further comprising an undercarriage having a plurality of wheels coupled to an elongate fore-and-aft wheel mounting beam and a first and second laterally opposed mounting brackets coupled to the wheel mounting beam and adapted to be coupled to the first and second undercarriage bearing supports, respectively.

10. An adjustable suspension system for a tracked vehicle comprising:

a drive wheel extending from the vehicle; and an undercarriage including a fore-and-aft extending undercarriage beam and a plurality of wheels coupled to the beam; and a track extending around the periphery of the drive wheel and the plurality of wheels, wherein the undercarriage is adapted to be rotatably coupled to the vehicle and is adapted to be adjustably rotated about a vertical axis, wherein the drive wheel is disposed above and between two of the plurality of wheels.

11. The adjustable suspension system of claim 10, wherein the vertical axis substantially intersects the rotational axis of the drive wheel.

12. A method of aligning a tracked suspension system having at least first and second wheels with first and second rotational axes, respectively, a drive wheel having a drive wheel axis of rotation, and an endless elastomeric track adapted to rotate about the wheels wherein the track is engaged to the drive wheel over a first wrap angle, the method including the step of:

rotating the first wheel and second wheel with respect to the drive wheel about a relative rotational axis that passes through the wrap angle when the relative rotational axis is translated to intersect the drive wheel axis of rotation and wherein the first and second rotational axes are not the same.

13. The method of claim 12 wherein the first wheel and the second wheel are rotated about a relative rotational axis that is within 30 degrees of dividing the wrap angle into two equiangular portions.

14. The method of claim 13 wherein the first wheel and the second wheel are rotated about a relative rotational axis that divides the wrap angle into two substantially equiangular portions.

15. The method of claim 12 wherein the drive wheel if fixed and wherein the first and second wheels are rotated about the relative rotational axis relative to the drive wheel.

16. The method of claim 12 wherein the drive wheel is rotated about the relative rotational axis relative to the first and second wheels.

17. The method of claim 15 wherein the track and the second wheel are rotated about the relative rotational axis relative to the drive wheel.

18. An adjustable suspension system for a tracked vehicle comprising:

a drive wheel extending from the vehicle and having a drive wheel rotational axis;

an undercarriage including a fore-and-aft extending undercarriage beam and a plurality of wheels having a plurality of corresponding rotational axes coupled to the beam; and a track extending around the periphery of the drive wheel and the plurality of wheels, wherein the undercarriage is adapted to be rotatably coupled to the vehicle and is adapted to be adjustably rotated about a vertical axis, wherein the drive wheel rotational axis is disposed above and between the plurality of corresponding rotational axes.

19. A method of aligning a tracked suspension system having at least first and second wheels with first and second rotational axes, respectively, and an endless elastomeric track adapted to rotate about the wheels wherein the track is engaged to a first one of the wheels over a first wrap angle, the method including the step of:

rotating the first wheel and track with respect to each other about a substantially vertical relative rotational axis that transects the wrap angle when the relative rotational axis is translated to intersect the first rotational axis.

* * * * *